[12] United States Patent
Pape et al.

(10) Patent No.: US 6,508,342 B2
(45) Date of Patent: Jan. 21, 2003

(54) DAMPER WITH INTEGRATED DUST TUBE AND RATE SURFACE

(75) Inventors: Stephen L. Pape, Beavercreek, OH (US); Zbigniew G. Krawiec, Cracow (PL)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/827,624

(22) Filed: Apr. 6, 2001

(65) Prior Publication Data

US 2002/0144869 A1 Oct. 10, 2002

(51) Int. Cl.[7] .................................................. F16F 9/36
(52) U.S. Cl. .................. 188/322.17; 267/201; 267/219; 267/293
(58) Field of Search ................................ 267/220, 195, 267/196, 201, 219, 292, 293, 294, 116, 139, 140, 140.11; 188/322.16, 322.17

(56) References Cited

U.S. PATENT DOCUMENTS

| 2,927,786 A | * | 3/1960 | Templeton | 267/220 |
|---|---|---|---|---|
| 3,412,990 A | * | 11/1968 | Gladstone | 267/220 |
| 4,542,811 A | * | 9/1985 | Miura | 188/322.17 |
| 5,261,650 A | * | 11/1993 | Hein | 267/220 |
| 5,487,535 A | * | 1/1996 | Carter et al. | 267/220 |
| 5,531,299 A | * | 7/1996 | Bataille | 188/322.17 |
| 5,996,982 A | * | 12/1999 | Bell | 267/221 |
| 6,186,486 B1 | * | 2/2001 | Gutman et al. | 267/220 |
| 6,199,672 B1 | * | 3/2001 | Wada et al. | 188/322.12 |
| 6,199,844 B1 | * | 3/2001 | McCormick | 267/221 |
| 6,247,685 B1 | * | 6/2001 | Takahashi et al. | 267/140.15 |
| 6,257,605 B1 | * | 7/2001 | Zernickel et al. | 267/220 |
| 6,325,187 B1 | * | 12/2001 | Boucher | 188/322.17 |

* cited by examiner

Primary Examiner—Christopher P. Schwartz
Assistant Examiner—Devon Kramer
(74) Attorney, Agent, or Firm—Scott A. McBain

(57) ABSTRACT

A damper assembly is provided including a telescopic damper having a piston rod extending from a first end. A mount assembly is mounted on the piston rod. A dust tube is provided the damper assembly including a substantially closed end, the closed end positioned between the telescopic damper and the mount assembly. The closed end of the dust tube includes an opening for receiving the piston rod and a rate surface for contacting a bumper portion of the mount assembly when the damper assembly contracts.

22 Claims, 2 Drawing Sheets

DAMPER WITH INTEGRATED DUST TUBE AND RATE SURFACE

TECHNICAL FIELD

This invention related to vehicle suspensions, and more particularly, to a dust shield for use with a damper.

BACKGROUND OF THE INVENTION

Dampers, e.g., shock absorbers or struts, for suspension systems in automotive vehicles are well known. Some dampers are provided with a mechanism by which the damper serves as a component of a vehicle leveling system. In such a damper, an air chamber is provided that is operatively connected to a source of pressurized air for increasing or decreasing the air pressure within the chamber. The air chamber can be formed between a dust shield and an air sleeve attached to the damper. The dust shield further protects the damper and its seals from contaminants such as dust, dirt, gravel, and so on. Generally, a dust shield is a molded or formed member including a hollow cylindrical body. The dust shield can be formed of metal or plastic, for example, and is positioned over an upper end of the damper, such as a monotube damper.

The air-adjustable damper is typically attached to the vehicle body by a rubber and steel shear mount. A stud holds the shear mount to the damper by threading onto an end of a piston rod. A rate washer portion of the stud or a bump plate is positioned between the rubber portion of the mount and the dust tube. The rate washer or bump plate contacts the rubber portion of the mount when the damper is fully compressed. The configuration of the rate washer determines the deflection rate of the rubber and steel shear mount. The rate washer also functions to hold the dust tube on the damper.

However, the rate washer or bump plate is a steel part that requires a coating for rust protection and adds unwanted mass to the damper. Also, the rate washer is expensive because the shape requires that the washer be machined. Further, threading the rate washer onto the damper piston rod requires an amount of assembly time.

It would be desirable to provide a damper assembly that overcomes these disadvantages.

SUMMARY OF THE INVENTION

One aspect of the present invention provides a dust tube for use with a damper including a tubular member having a hollow cylindrical body portion and a substantially closed end. The closed end includes a contoured rate surface on an outer portion thereof.

Other aspects of the present invention provide a dust tube with the closed end including a central opening. The rate surface extends from the central opening to the hollow cylindrical body portion. The rate surface can include a concave profile. The rate surface can include a contoured portion.

Another aspect of the present invention provides a damper assembly including a telescopic damper having a piston rod extending from a first end. A mount assembly is mounted on the piston rod. A dust tube includes a substantially closed end with the closed end being positioned between the telescopic damper and the mount assembly. The closed end can include an opening for receiving the piston rod and a rate surface for contacting a bumper portion of the mount assembly when the damper assembly contracts.

Other aspects of the present invention provide first and second washer members, the first and second washer members respectively positioned adjacent an inner and an outer surface of the closed end adjacent the central opening. The first and second washer members are spaced apart by a spacer member, the spacer member positioned within the central opening of the closed end. A pair of o-ring seals are respectively disposed between an outer diameter of the piston rod and an inner diameter of the spacer and between an outer diameter of the spacer and an inner diameter of the central opening. The first washer member is positioned to contact a shoulder feature of the piston rod. The mount assembly includes a central cylinder disposed on the piston rod. One end of the central cylinder contacts the second washer member and the other end of the central cylinder contacts a retaining member. A fastener member can secure the retaining member against the central cylinder. The fastener member can be threadably engaged to the piston rod. An elastomeric member can be disposed on the central cylinder. A bumper portion can form a portion of the elastomeric member, the bumper being positioned adjacent the rate surface and being drawn into engagement with the rate surface upon contraction of the assembly. The assembly can include at least a pair of mounting studs provided in the elastomeric portion of the mount assembly. The rate surface can be a contoured surface. The rate surface can be a concave surface.

Another aspect of the present invention provides a damper assembly including a telescopic damper having a rod extending from a first end. A mounting means can be mounted on the rod and a dust tube is positioned on the damper, the dust tube including a substantially closed end, the closed end including contacting means formed thereon for contacting a bumper portion of the mounting means when the damper assembly contracts.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
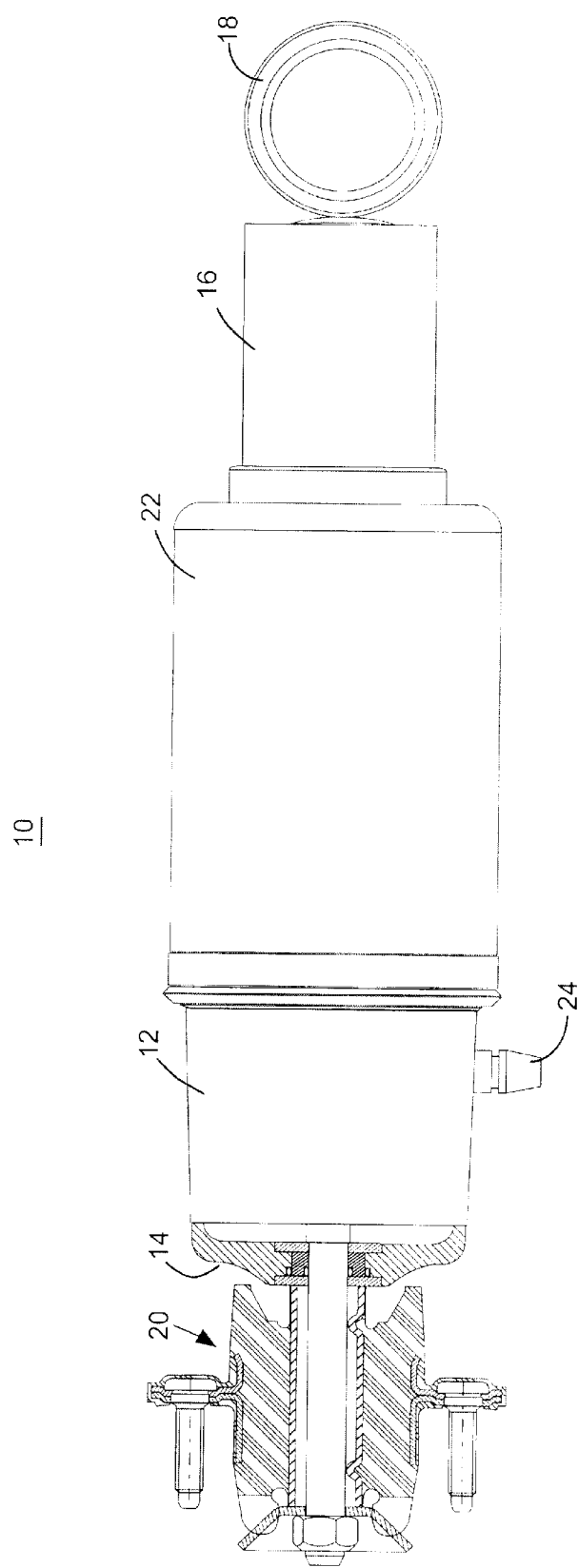
FIG. 1 illustrates an embodiment of a damper assembly of the present invention.

Referring to FIG. 1, a damper assembly, illustrated generally at 10 is provided for a vehicle. The damper assembly 10 includes a dust tube 12 with an integrated rate washer profile or surface 14. The assembly 10 can generally include a damper body tube or reservoir tube 16 with an attaching portion 18 for attaching a lower end of the damper assembly to a vehicle (not shown). Opposite the attaching portion 18 a mount assembly 20 for attaching the other end of the assembly 10 to the vehicle can be provided. An air sleeve 22 can extend between the dust tube 12 and the damper body tube 16 to form an internal air chamber (not shown) therebetween for changing the ride characteristics and ride height of the vehicle as is conventional. A fixture 24 can be provided in the dust tube 12 to allow filling or venting of air in and out of the chamber.

Figure 2:
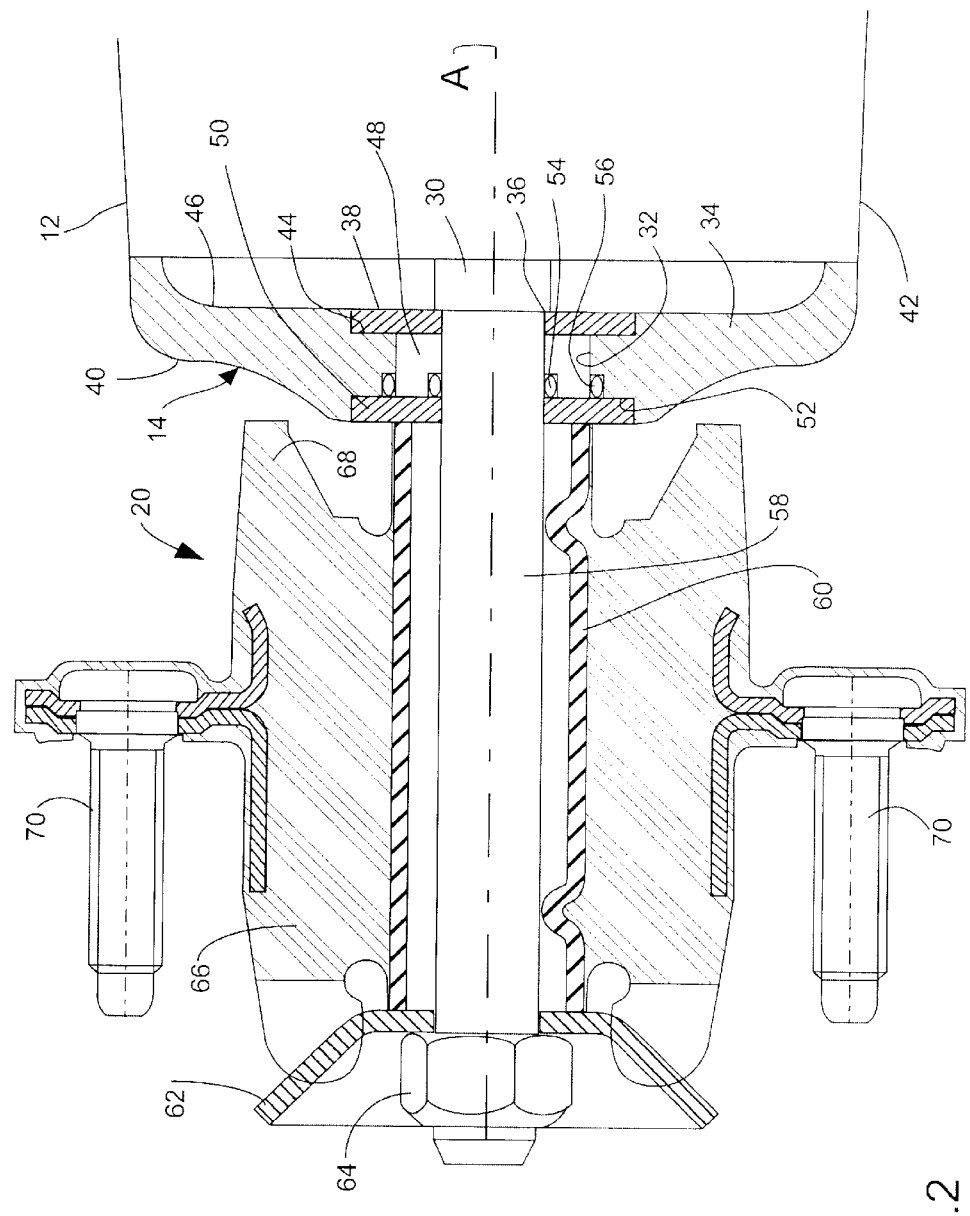
FIG. 2 illustrates an enlarged cross-sectional view of a portion of the assembly of FIG. 1.

Referring to FIG. 2, a portion of the damper assembly 10 of FIG. 1 is illustrated. The damper assembly 10 includes a dust tube 12. A piston rod 30 can extend through a piston rod opening 32 in an upper portion 34 of the dust tube 12. A shear mount assembly 20 can be attached to the end of the piston rod 30.

The dust tube 12 can be formed from plastic, a composite material, or any suitable material. As will be shown, forming the dust tube 12 from plastic, or the like, provides an inexpensive, durable element, the rate profile of which can be easily modified for purposes of providing differing compression rates of the mount assembly 20 by, for example, varying the molds in which the dust tubes are formed. The dust tube 12 can take the shape of a cylindrical sleeve with a closed end or upper portion 34 positioned adjacent the mount assembly 20. The closed end 34 can include a central opening or piston rod opening 32. A rate surface 14 for contacting the shear mount assembly 20 can be formed on an outer surface 40 of the closed end 34 of the dust tube 12. In the illustrated embodiment shown, the rate surface 14 is an annular, gently concave surface adjacent to and surrounding the central opening 32. The rate surface 14 can extend from the central opening 32 radially outwardly to the dust tube sidewall portion or sleeve 42.

It will be understood that the rate surface 14 can include various configurations or cross-sectional profiles. The configurations can include contoured surfaces, for example curved, angled or other configurations. As will be discussed in more detail below, different configurations of the rate surface 14 will provide different rate of compression properties to the damper assembly 10 when in a fully compressed state.

A piston rod 30 of the damper assembly 10 can extend axially through the central opening 32 and the shear mount assembly 20. The piston rod 30 can include a shoulder 36. An inner washer 38 can be positioned on the piston rod 30 contacting the shoulder 36. The inner washer 38 can be positioned in an inner groove 44 formed adjacent the opening 32 on an inner surface 46 of the closed end 34 of the dust tube 12. A spacer 48 can be disposed on the piston rod 30 in contact with the inner washer 38. The spacer 48 can be positioned within the central opening 32 of the dust tube 12. An outer washer 50 can be positioned adjacent the spacer 48 and positioned within an outer groove 52 formed on the outer surface 40 of the closed end 34 of the dust tube 12.

An inner o-ring seal 54 can be disposed between the outer diameter of the piston rod 30 and the inside diameter of the spacer 48. An outer o-ring seal 56 can be disposed between the outer diameter of the spacer 48 and the inner diameter of the opening 32. The inner and outer o-ring seals 54, 56 prevent leakage of air from the interior of the damper 10.

A distal portion 58 of the piston rod can extend outwardly from the opening 32 in the dust tube closed end 34. Attached to the distal portion 58 of the piston rod is a shear mount assembly 20. The shear or upper mount assembly 20 isolates the piston rod 30 from the vehicle body (not shown) so that vibrations are not transmitted to the interior of the vehicle. Further, upon compression of the damper, the shear mount assembly 20 contacts the rate surface 14 of the dust tube 12.

The mount assembly 20 can include a metal tube or cylinder 60. The metal cylinder 60 can be positioned on the distal portion 58 of the piston rod 30. One end of the cylinder can be positioned on the outer washer 50 and can be held in place by a cup shaped retainer 62 at the other end. The cup shaped retainer 62 can be secured to the end of the piston rod 58 by a threaded nut 64, or the like, to secure the retainer 62 against the metal cylinder 60, and thus, retain the mount assembly 20 to the damper 10.

The shear mount assembly 20 further includes an elastomeric portion 66 surrounding the cylinder. The elastomeric portion 66 can include a skirt portion or bumper portion 68 positioned adjacent the rate surface 14 of the dust tube 12. A pair of mounting studs 70 are secured within the elastomeric portion 66 for fastening the shear mount assembly 20 to a vehicle frame or member (not shown).

On compression of the damper, which occurs when the damper 10 contracts or collapses, the elastomeric bumper portion 66 of resilient foam material, urethane, natural rubber or an other suitable material is compressed after the piston (not shown) strokes into the reservoir (not shown) and the piston rod 30 draws the elastomeric portion, skirt or bumper portion 68 of the shear mount 20 into contact with the rate surface 14 of the upper portion 34 of the dust tube 12. The rate surface 14 engages or deflects the elastomeric bumper portion 68 of the shear mount 20 in a manner to moderate the impact or moderate the rate of compression of the shear mount with the dust tube upper portion 34. In effect, if the rate surface 14 were formed strictly perpendicular to the piston rod axis A, the impact of the elastomeric bumper portion 68 would be sudden. In this case, the compression of the elastomeric bumper portion 68 and the "bottoming" characteristics of the damper would depend on the compressive characteristics of the elastomeric portion of the shear mount 20 alone. If the rate surface 14 is angled away from the perpendicular, the engagement of the elastomeric bumper portion 68 and the rate surface will be more gradual and the bottoming characteristics of the damper will be "softer." Thus, it will be understood that the profile of the rate surface 14 can be changeable to control and cushion the compressive response characteristics or final compressive action of the damper 10. It will be understood that the term "contoured" in application to the rate surface 14, will refer to a surface which is not a flat surface formed at a perpendicular orientation with respect to the axial A direction. In other words, the surface 14, for contacting the bumper 68 can include an angled or curved surface or a combination of an angled or curved surface or profile.

In this manner, a surface is provided for controlling a last portion of the compressive response characteristics of a damper while eliminating an expensive headed and machined steel stud/rate washer component, eliminating the need for rust protection of the stud/rate washer, eliminating the threaded joint between the stud and piston rod, reducing the overall mass and cost of the damper assembly, and which is easily changeable to different configurations.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A dust tube for use with a damper comprising:
   a tubular member having a hollow cylindrical body portion and a substantially closed end, wherein the closed end includes a contoured rate surface on an outer portion thereof, and the contoured rate surface is annular and radially curved.

2. The dust tube of claim 1 wherein the closed end includes a central opening.

3. The dust tube of claim 2 wherein the rate surface extends from the central opening to the hollow cylindrical body portion.

4. The dust tube of claim 3 wherein the rate surface includes a concave profile.

5. The dust tube of claim 3 wherein the rate surface includes a contoured portion.

6. A damper assembly comprising:
a telescopic damper having a piston rod extending from a first end;
a mount assembly mounted on the piston rod; and
a dust tube positioned on the telescopic damper, the dust tube including a substantially closed end, the closed end positioned between the telescopic damper and the mount assembly, the closed end including a central opening for receiving the piston rod and a rate surface for contacting a bumper portion of the mount assembly when the damper assembly contracts;
wherein the rate surface is annular and radially curved.

7. The assembly of claim 6 further comprising:
first and second washer members, the first and second washer members respectively positioned adjacent an inner and an outer surface of the closed end adjacent the central opening.

8. The assembly of claim 7 wherein the first and second washer members are spaced apart by a spacer member, the spacer member positioned within the central opening of the closed end.

9. The assembly of claim 8 wherein a pair of o-ring seals are respectively disposed between an outer diameter of the piston rod and an inner diameter of the spacer member and between an outer diameter of the spacer member and an inner diameter of the central opening.

10. The assembly of claim 8 wherein the first washer member is positioned to contact a shoulder feature of the piston rod.

11. The assembly of claim 10 wherein the mount assembly includes a central cylinder disposed on the piston rod.

12. The assembly of claim 11 wherein one end of the central cylinder contacts the second washer member and the other end of the central cylinder contacts a retaining member.

13. The assembly of claim 12 wherein the retaining member is secured against the central cylinder by a fastener member.

14. The assembly of claim 13 wherein the fastener member is threadably engaged to the piston rod.

15. The assembly of 11 wherein an elastomeric member is disposed on the central cylinder.

16. The assembly of claim 14 wherein the bumper portion forms a portion of the elastomeric member, the bumper portion being positioned adjacent the rate surface and being drawn into engagement with the rate surface upon contraction of the assembly.

17. The assembly of claim 16 wherein at least a pair of mounting studs are provided in an elastomeric portion of the mount assembly.

18. The assembly of claim 6 wherein the rate surface is a contoured surface.

19. The assembly of claim 6 wherein the rate surface is a concave surface.

20. A damper assembly comprising:
a telescopic damper having a rod extending from a first end;
mounting means mounted on the rod; and
a dust tube positioned on the telescopic damper, the dust tube including a substantially closed end, the closed end including contacting means formed thereon for contacting a bumper portion of the mounting means when the damper assembly contracts;
wherein the contacting means is annular and radially curved.

21. A damper assembly comprising:
a telescopic damper having a piston rod extending from a first end;
a mount assembly mounted on the piston rod;
a dust tube positioned on the telescopic damper, the dust tube including a substantially closed end, the closed end positioned between the telescopic damper and the mount assembly, the closed end including a central opening for receiving the piston rod and a rate surface for contacting a bumper portion of the mount assembly when the damper assembly contracts;
first and second washer members, the first and second washer members respectively positioned adjacent an inner and an outer surface of the closed end adjacent the central opening and the first and second washer members spaced apart by a spacer member, the spacer member positioned within the central opening of the closed end; and
a pair of o-ring seals respectively disposed between an outer diameter of the piston rod and an inner diameter of the spacer and between an outer diameter of the spacer and an inner diameter of the central opening.

22. A damper assembly comprising:
a telescopic damper having a piston rod extending from a first end;
a mount assembly mounted on the piston rod;
a dust tube positioned on the telescopic damper, the dust tube including a substantially closed end, the closed end positioned between the telescopic damper and the mount assembly, the closed end including a central opening for receiving the piston rod and a rate surface for contacting a bumper portion of the mount assembly when the damper assembly contracts;
first and second washer members, the first and second washer members respectively positioned adjacent an inner and an outer surface of the closed end adjacent the central opening and the first and second washer members spaced apart by a spacer member, the spacer member positioned within the central opening of the closed end;
wherein the first washer member is positioned to contact a shoulder feature of the piston rod, the mount assembly includes a central cylinder disposed on the piston rod, one end of the central cylinder contacts the second washer member and the other end of the central cylinder contacts a retaining member, the retaining member is secured against the central cylinder by a fastener member, the fastener member is threadably engaged to the piston rod, the bumper portion forms a portion of the elastomeric member, the bumper portion being positioned adjacent the rate surface and being drawn into engagement with the rate surface upon contraction of the assembly, and at least a pair of mounting studs are provided in an elastomeric portion of the mount assembly.

* * * * *